Dec. 11, 1923.

A. F. BROTZ 1,476,686

MULTIPLE UNIT SYSTEM OF ENGINE DRIVEN GENERATORS

Filed Jan. 6, 1922

WITNESSES
M. E. Downey
C. L. Naal

INVENTOR
Anton Frank Brotz
By R. S. Caldwell
ATTORNEY

Patented Dec. 11, 1923.

1,476,686

UNITED STATES PATENT OFFICE.

ANTON FRANK BROTZ, OF KOHLER, WISCONSIN, ASSIGNOR TO KOHLER COMPANY, OF KOHLER, WISCONSIN, A CORPORATION OF WISCONSIN.

MULTIPLE-UNIT SYSTEM OF ENGINE-DRIVEN GENERATORS.

Application filed January 6, 1922. Serial No. 527,372.

*To all whom it may concern:*

Be it known that I, ANTON FRANK BROTZ, a citizen of the United States, and resident of Kohler, in the county of Sheboygan and State of Wisconsin, have invented new and useful Improvements in Multiple-Unit Systems of Engine-Driven Generators, of which the following is a description, reference being had to the accompanying drawings, which are a part of this specification.

This invention has for its object to provide a switch for establishing the starting, running and stopping circuit connections for one or more self-starting engine driven generator units.

It is sometimes found desirable to make use of several small generator units of the type known as farm lighting plants in order to supply a demand exceeding the capacity of a single unit and in such instances it is an object to provide a simple switch mechanism that will start the several generator units in operation simultaneously when current is required and that will similarly cause the generator units to cease operating when current is no longer required. Also it is desirable that such a switch may be capable of establishing a connection by means of which the low voltage storage battery employed for starting the generator units may be so connected as to receive a charge from the generators said battery being in series with a charging resistance compensating for the difference between the battery voltage and the generator voltage.

With the above and other objects in view the invention consists in the switch for engine driven generators as herein claimed and all equivalents.

Figure 1:
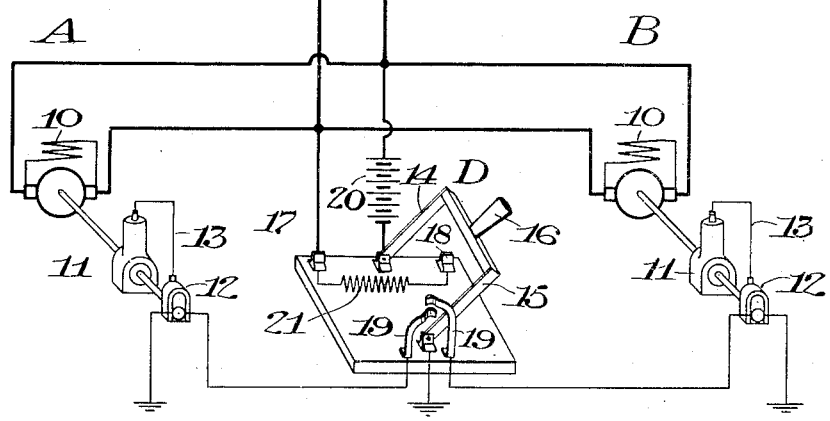
Figure 2:
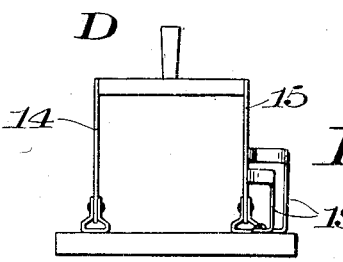

Referring to the accompanying drawings in which like characters of reference indicate the same parts in different views, Figure 1 is a diagram showing the switch of this invention connected for use in controlling a generating system employing a pair of motor driven generator units in parallel, and Figure 2 is a detail view of the switch.

In these drawings A and B represent gas engine driven generator units connected in parallel to supply service mains C containing lamps, motors or other translating devices. While two units are shown, it will be understood that any number may be used in the same manner. The generator units are preferably alike and, as shown, each consists of a shunt wound generator 10 directly connected with a gas engine 11 provided with a magneto 12 to supply its ignition circuit 13. These details are not essential to the invention but are chosen to simplify the illustration as, obviously, compound wound generators may be used, and battery ignition instead of magneto ignition. However, the illustration chosen fairly represents the actual practice as used for coupling farm lighting plants in parallel as for use on shipboard in supplying electrical energy for wireless signalling systems.

The switch proper D resembles a double blade double throw knife switch, one blade 14 of which controls the battery connections for starting the generator units and for recharging the battery, and the other blade 15 controls the magneto grounding connections for stopping the operation of the generator units. The blades carry a common handle 16, by which they may be thrown from one extreme position in which blade 14 engages spring clip 17 to the other extreme position in which it engages spring clip 18, while in a position intermediate of these extremes the other blade 15 engages spring contacts 19. Spring clip 17 is connected directly with one generator terminal bus, while blade 14 is connected with a battery 20 connected to the other generator terminal bus, and spring clip 18 is connected with spring clip 17 by means of a battery charging resistance 21. The other blade 15 is connected directly with the ground, while the spring contacts 19 with which it engages in the intermediate position of the switch handle are connected respectively with the ungrounded terminals of the magnetos 12 of the generating units.

When it is desired to start the generating system in operation the switch handle is thrown to the left, engaging blade 14 with clip 17. This connects the battery 20 directly across the terminals of the generators in parallel and, though the battery is of lower voltage than the generators, being usually of 24 volts while the generators are of 110 volts, this connection causes the generators to operate as motors for starting their respective gas engines 11. When the gas engines pick up speed and drive the generators to develop the line voltage, the switch handle is thrown to the other extreme position where the blade 14 engaging spring clip 18 includes the battery 20 across the line with the charging resistance 21 in series therewith, so that the battery will take a recharge at a reasonable charging rate.

When it is desired to discontinue the operation of the generating system the switch handle is moved to its intermediate position where the blade 15 engages the spring contacts 19 and, by thus grounding the magnetos of the gas engines of the generating units, the engines cease to operate and the system becomes idle.

The control switch may be located wherever desired and by means of it the operation of the system may be controlled at will, the generators being brought from idle condition to operating condition immediately by the throw of the switch, thus making the system available for use in radio work and wherever it is desired to have a prompt response to a demand for service.

While the switch is shown to be of the hand operated type, it is obvious that it may be electrically or mechanically operated.

What I claim as new and desire to secure by Letters Patent is:

1. A multiple unit system of gas engine driven generator units comprising a plurality of gas engine driven generator units connected in parallel with service mains, a battery of lower voltage than the generators, a charging resistance, a switch for connecting the battery across the terminals of the generators whereby the generators operate as motors for starting their gas engines when the switch is moved to one position and for connecting the battery across the terminals of the generators in series with the charging resistance when the switch is moved to another position, and engine disabling means for the engines of the generator units controlled by the switch in another position.

2. In a multiple unit generating system of gas engine driven generator units supplying common service mains, a storage battery of lower voltage than the generators connected with one of the service mains, a charging resistance, gas engine disabling means for the gas engines of the respective units, a double throw double blade knife switch having one blade connected with the storage battery and having one of its co-operating clips connected with the other service main so that when said blade is closed with said clip the battery is directly connected across the mains to operate the generators as motors for starting their gas engines, the other clip of said blade having the charging resistance connected between it and the first mentioned clip whereby when said blade is engaged with said other clip the battery is connected across the mains with the charging resistance in series therewith, and spring contacts controlling the engine disabling means in position to be engaged by the other blade of the switch in another position of the switch.

3. In a multiple unit generating system of gas engine operated generator units, a plurality of gas engine operated generator units connected in parallel, common service mains therefor, a storage battery of lower voltage than the generators and connected with one of the service mains, a double blade double throw knife switch having one blade connected with the storage battery, a charging resistance connected between the clips of said blade, one of the clips of said blade being connected with the other service main, the other blade of said switch being connected with the ground, spring contacts in position to be engaged by said other blade of the switch when the switch is in an intermediate position between its clips, and magneto ignition means on the gas engines of the respective generator units connected with the spring contacts.

In testimony whereof, I affix my signature.

ANTON FRANK BROTZ.